Feb. 5, 1935. C. P. BRIDGES 1,990,110
UNIT HEATING VENTILATOR
Filed Aug. 14, 1931 2 Sheets-Sheet 2
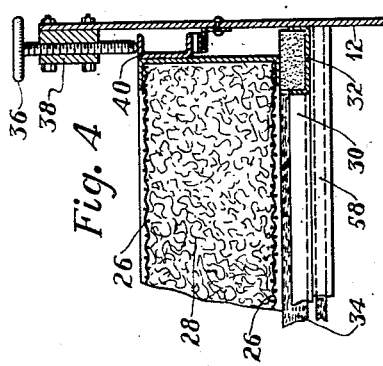
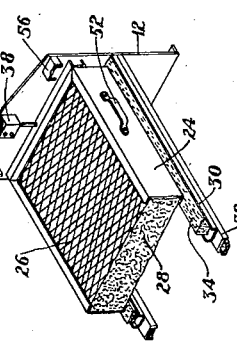
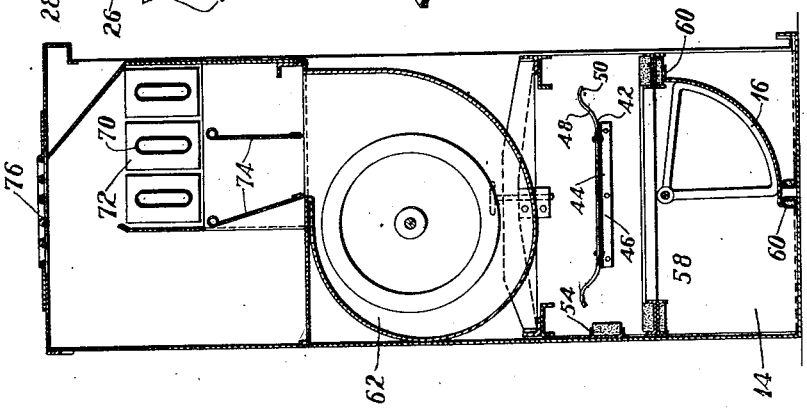
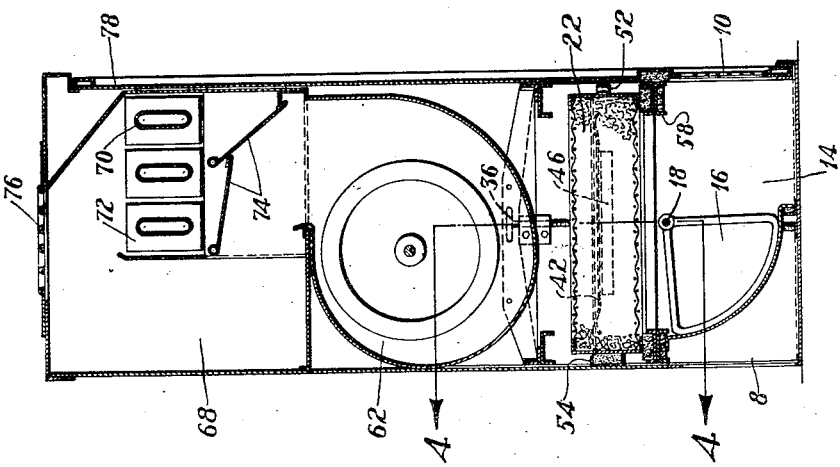
Witness
Paul F. Bryant
Inventor
Charles P. Bridges
by his attorneys
Van Everen, Fish, Hildreth & Cary Patented Feb. 5, 1935

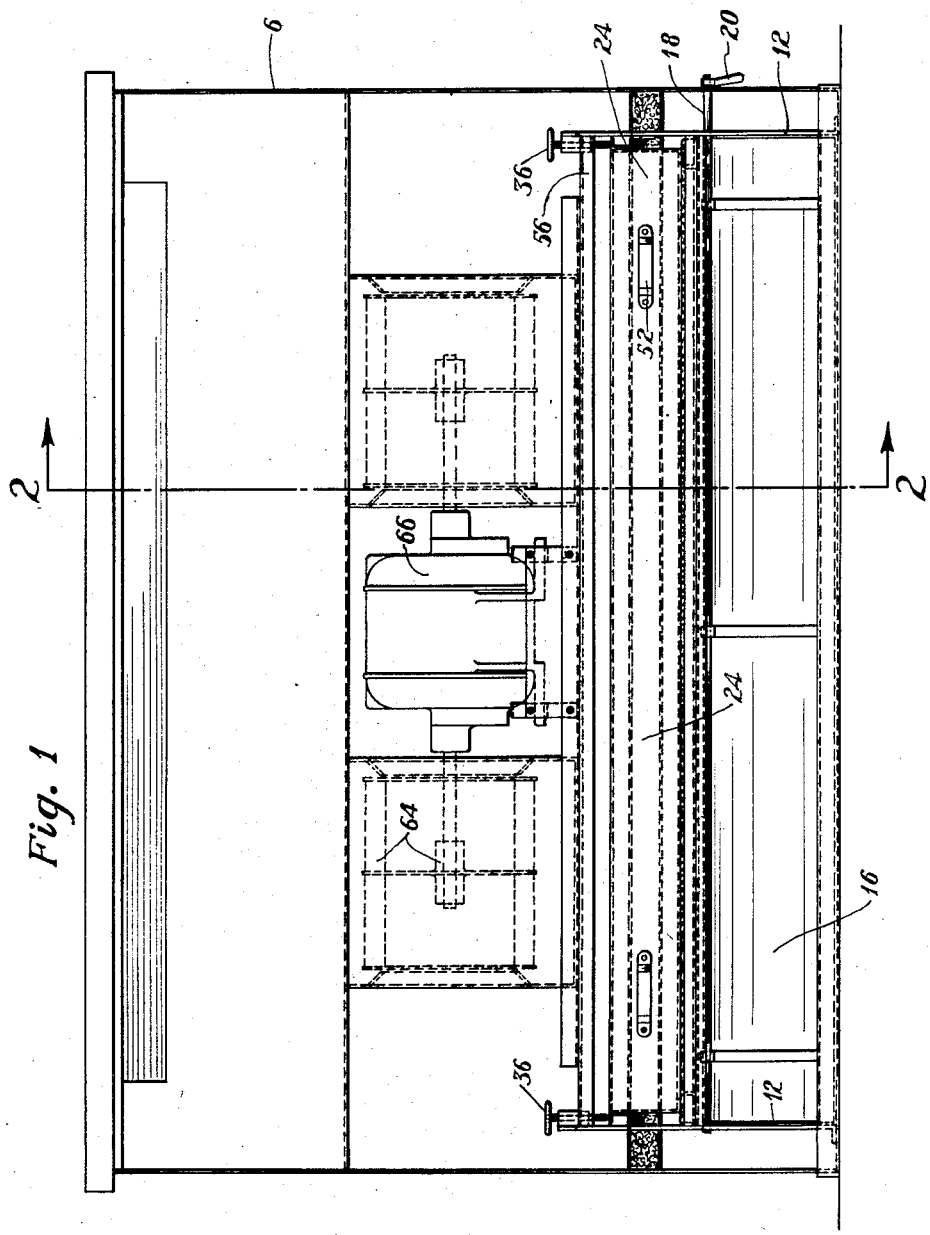

1,990,110

UNITED STATES PATENT OFFICE 1,990,110

UNIT HEATING VENTILATOR

Charles P. Bridges, Dedham, Mass., assignor to B. F. Sturtevant Company, Hyde Park, Mass., a corporation of Massachusetts Application August 14, 1931, Serial No. 557,052

14 Claims. (Cl. 183—49)

The present invention relates generally to heating ventilators and particularly to unit heating ventilators wherein the air passed therethrough is filtered to free it from suspended matter.

It is the object of the present invention to provide a unit heating ventilator having a filter device which shall be simple in construction and efficient in operation, and which may be readily removed for cleaning or inspection.

The invention in its preferred form is illustrated in the accompanying drawings in which Fig. 1 is a front elevation, with the panel removed, of a unit heating ventilator embodying the present invention; Fig. 2 is a vertical, transverse sectional view along the line 2—2 of Fig. 1, showing the filter in position; Fig. 3 is a similar view with the front of the casing and the filter removed, and the damper and shutters readjusted; Fig. 4 is a vertical, longitudinal sectional view on the line 4—4 of Fig. 2, of a portion of the casing and filter, showing the details of the filter mounting and the mode of effecting a seal between the unit heating ventilator and the filter; and Fig. 5 is a view in perspective of the filter and a portion of the casing and filter mounting, with the filter positioned in the ventilator.

The ventilator illustrated in the accompanying drawings is of a well known type and comprises the usual casing having fresh air and recirculated air inlets at its bottom, the intermediate motor driven fans for moving the air through the apparatus, and the heating radiator and discharge opening at the top, with shutters for by-passing more or less of the air around the radiator. Between the bottom inlets and the fans is the filtering unit normally held in air-tight contact with its mounting, but easily withdrawn for inspection, cleaning and replacement.

Referring to the drawings, the casing 6 is intended to be placed against the outer wall of the room with the fresh air inlet 8 in communication with a passage or opening in the wall to the outer air. Opposite this fresh air opening is the recirculated air inlet 10 provided with the usual grille. These air inlets do not extend entirely across the back and front of the casing, but terminate a short distance from the ends thereof and just within the end partitions 12 which extend upwardly from the bottom of the casing about one third the height of the casing.

Within the inlet chamber 14 so formed is located the swinging damper 16 in the form of a quadrant, fixed upon the shaft 18 pivotally mounted in the end partitions, with one end extended through the end of the casing and provided with the actuating handle 20. By means of this handle the damper may be adjusted to control the source of air supply, admitting recirculated air and cutting off the fresh air supply, when set in the position shown in Fig. 2, and admitting fresh air and cutting off recirculated air when set as in Fig. 3.

Immediately above the inlet chamber in position to filter all the incoming air, whether from out of doors or from the room wherein the apparatus is located, is the filtering unit 22. As shown in Fig. 5, this is formed of a rectangular frame 24 of thin metal, pressed into channel form with wire netting top and bottom 26, and the interior filled with steel wool 28 or other suitable material treated with oil or other dust collecting liquid.

The filter is mounted in the casing upon the longitudinal and side members 30 and 32, secured to the end partition 12, the members being of U or channel shape and carrying in their channels strips of felt or other yielding packing 34 to make air tight contact or joint between the filter and its supports. A hand screw 36 mounted in a bracket 38 secured to each end partition 12 near its top is arranged to engage the top of the outwardly flaring channel bars 40 carried by the ends of the filter frame to force the filter into firm contact with the packing 34, as shown in Figs. 2 and 4.

To facilitate the insertion and removal of the filtering unit 22, a yielding support or spring device is provided on each end partition which tends to lift and support the filter above its supporting members 30 and 32 but which yields under the action of the hand screws 36 to permit the seating of the filter on its supporting members 30 and 32. This spring device is best shown in Fig. 3 and consists of the spring 42 having a straight middle portion 44 secured to the bracket 46 on the end partition, and upwardly bowed end portions 48 with downwardly curved extremities 50. These springs are arranged to engage the under face of the channel bars 40 on the ends of the filter unit and are stiff enough to support the unit so that the latter may be slid in and out on the springs in the same manner as a drawer is pushed in and pulled out on its guides. Thus, with the spring device and the hand screw as shown in Fig. 3, the filter may be inserted and slid into position above and out of contact with its supporting members. Upon the actuation of the hand screw, the filter will be forced down onto the packing, the spring yielding during this operation, the parts then being as shown in Fig. 2. In the reverse operation, as the hand screw is retracted, the filter is raised by the springs, following the screws until finally the limit of upward movement is reached, the screws disengage the filter and the latter is free to be withdrawn.

The handles 52 on the front of the filter unit provides a convenient means for pulling out and pushing in the unit. In order to position the unit properly above its supporting members when the unit is inserted in the casing, a stop is formed of the horizontal channel bar 54 on the inside of the back wall of the casing, felt or other yielding material being placed in the channel to permit the vertical movement of the unit when the hand screws are actuated.

The tops of the end partitions 12 are tied together and braced by the upper inverted channels 56, a similar pair of inverted channels 58 being positioned immediately beneath the filter supporting longitudinal channel members 30, and being filled with felt or other packing to be engaged by the flanges 60 on the quadrant damper 16.

Above the filtering unit and its mounting are the centrifugal fans 62 of the double inlet type, the rotors 64 of which are mounted directly upon the shaft of the driving motor 66. The usual involute fan casing discharges the air upwardly into the heating chamber 68 in which are located the heating units 70 in the form of radiator sections having extended surface 72. The swinging shutters 74 may be adjusted as shown in Fig. 2, to direct all the air past the radiator, or as shown in Fig. 3, to direct all of the air through the radiator, or to any desired intermediate position, either by hand or by automatic controlling devices, all as is well known in this type of ventilator.

The air at the desired temperature is discharged through the grilled opening 76 into the room.

The front of the casing is made in the form of a removable door or panel 78 to give access to the interior for inspection, or repair, or adjustment, or for the removal of the filter for cleaning or replacement.

In operation, the inlet damper being set in the desired position to supply fresh or recirculated air, the shutters being adjusted and steam or other heating fluid being supplied to the radiator, the fans are set in operation. Air then passes from whichever inlet is open, through the filter, through the fans, through or past the radiators as determined by the shutter adjustment, and finally through the discharge at the top of the casing into the room.

When the filter becomes clogged in use from the accumulation of material separated from the air passing through the heater, the front panel of the casing is removed, the hand screws released, and the filtering unit withdrawn, to be cleaned and replaced or a fresh filter substituted by a reversal of these operations.

The above described construction of filter and mounting is simple and inexpensive to manufacture, is efficient in operation with all joints air tight, and provides for the easy and quick removal and replacement with a minimum of effort on the part of the operator.

While the present invention has been shown and described in what is now considered to be its preferred form, it is to be understood that it may be embodied in other constructions and arrangements within the scope of the claims.

Having thus described the invention, what is claimed is:

1. A unit ventilator comprising a casing having an air inlet and an outlet, a removable filter, a yielding support for slidingly receiving the filter, and adjustable retaining means acting against the yielding support.

2. A unit ventilator comprising a casing having an air inlet and an outlet, a slidingly removable filter, sealing means to engage the filter, a yielding support for the filter to permit introduction of the filter into the casing out of engagement with the sealing means, and retaining means to seal the filter against the action of the yielding support.

3. A unit ventilator comprising a casing having an air inlet and an outlet, a filter frame, a filter carried thereby, supporting members for the filter frame, sealing means between the supporting members and the frame, means for pressing the frame into engagement with the sealing means, and yielding means to raise the frame above the sealing means upon release of the pressure.

4. A unit ventilator comprising a casing having an air inlet and an outlet, a filter frame, a filter carried thereby, supporting members for the filter frame, sealing means between the supporting members and the frame, means for pressing the frame into engagement with the sealing means, and yielding means to raise the frame above the sealing means upon release of the pressure, said yielding means forming a support to permit sliding movement of the frame into or out of the casing.

5. A unit ventilator comprising a casing having an air inlet and an outlet, filter supporting members in the casing, a flat spring device at each end of the casing, a filter frame having side members to slide on the springs, and means for pressing the frame against the action of the springs into engagement with the supporting members.

6. A unit ventilator comprising a casing having an air inlet and an outlet, filter supporting members in the casing, a flat spring device at each end of the casing, a filter frame having side members to slide on the springs, and manually operable screws for pressing the frame against the action of the springs into engagement with the supporting members.

7. A unit ventilator comprising a casing having an air inlet and an outlet, filter supporting members in the casing, packing material carried by the filter supporting members, a filter frame, outwardly extending bars on the frame, yielding means on the casing for engaging the bars, and means for forcing the frame into engagement with the packing against the action of the yielding means.

8. A unit ventilator comprising a casing having a fresh air inlet, a filter, a recirculated air inlet and an outlet, a rotatable quadrantal damper to vary the proportions of fresh and recirculated air, braces arranged lengthwise above the damper, packing carried by the braces for the filter and for the damper, and means on the damper to engage the packing carried by one or the other of the braces.

9. A unit ventilator comprising a casing having an air inlet and an outlet, a slidingly removable filter, sealing means carried by the casing to be engaged by the filter when in operative position, a support for the filter for holding the filter out of engagement with the sealing means during replacement and removal of the filter, and supplementary devices for moving the filter into engagement with said sealing means.

10. A unit ventilator comprising a casing having a fresh air inlet, a recirculated air inlet and an outlet, a rotatable damper to vary the proportions of fresh and recirculated air, a filter above the inlets, a support for the filter comprising channel members having channels on their upper and under sides, and packing material carried in the channels on the upper side of the support to be engaged by the filter and on the under side of the support to be engaged by the damper.

11. A unit ventilator comprising a casing having an opening, a removable closure for the opening, a filter adapted to be held in operative position within the casing, and to be withdrawn from the casing through the opening with a sliding movement, spring guides for supporting the filter during such sliding movement and tending to move the filter in a direction transverse to such sliding movement from operative into inoperative position in the casing.

12. A unit ventilator comprising a casing, a filter removably supported in operative position within the casing and adapted to be withdrawn therefrom, the casing and filter having cooperating faces mutually engaging when the filter is in operative position, means for securing the filter in operative position, and supplementary yielding devices for moving the filter out of operative position at an angle to the direction of withdrawal from the casing.

13. A unit ventilator comprising a casing, a filter removably secured within the casing and adapted to be withdrawn therefrom, the casing and the filter having cooperating faces mutually engaging when the filter is in operative position, means for securing the filter in operative position, and spring devices for moving the filter out of operative position in a direction substantially at right angles to the direction of withdrawal from the casing when the securing means are released.

14. A unit ventilator comprising a casing, a filter removably mounted within the casing, the casing and filter having cooperating faces mutually engaging when the filter is in operative position, means for securing the filter in operative position, means for supporting the filter to permit removal and replacement of the same with a sliding movement, said means tending normally to move the filter in a direction transverse to such sliding movement to carry the filter out of operative position.

CHARLES P. BRIDGES.